2 Sheets—Sheet 1.
T. F. PETERSON.
Purifying Water for Manufacture of Ice.
No. 101,035.                                   Patented Mar. 22, 1870.
*Thomas F. Peterson*
*David James, Witness*
*John Roy, Witness.*
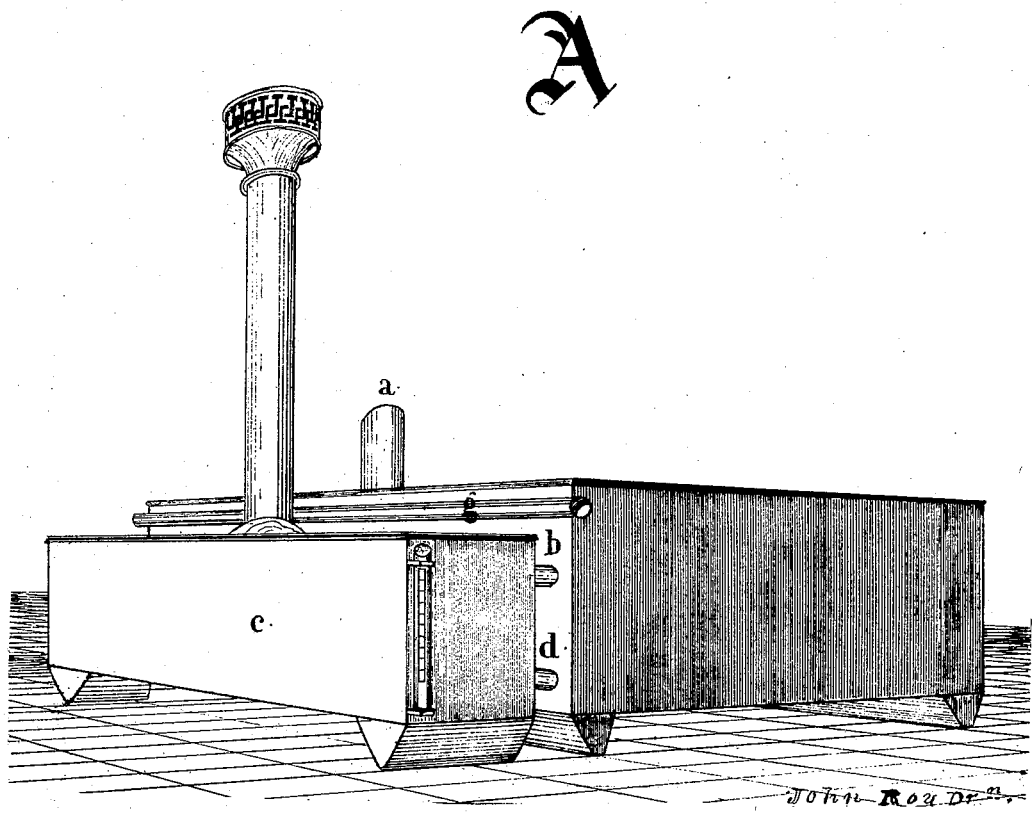

2 Sheets—Sheet 2.
T. F. PETERSON.
Purifying Water for Manufacture of Ice.
No. 101,035. Patented Mar. 22, 1870.
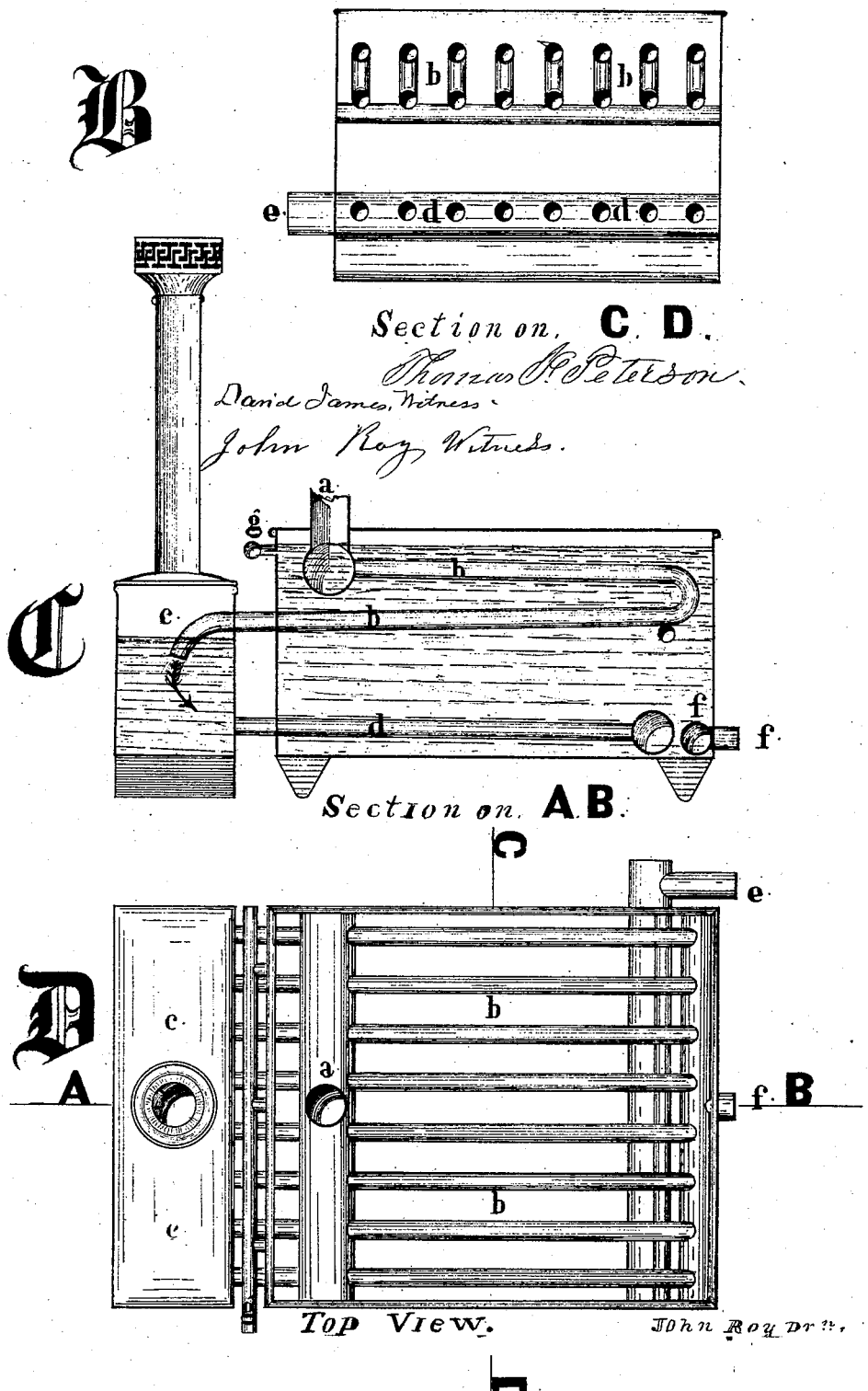

UNITED STATES PATENT OFFICE.

THOMAS F. PETERSON, OF NEW ORLEANS, LOUISIANA.

IMPROVED APPARATUS FOR PURIFYING WATER FOR THE MANUFACTURE OF ICE.

Specification forming part of Letters Patent No. 101,035, dated March 22, 1870.

*To all whom it may concern:*

Be it known that I, THOMAS F. PETERSON, of New Orleans, in the parish of Orleans and State of Louisiana, have invented a new and improved Mode of Distillation, whereby water is deprived of all the air and incondensable gases, rendering the same clear and transparent for the manufacture of ice, or other purposes; and I do hereby declare that the following is a full, clear, and exact description thereof, which will enable others skilled in the art to make and use the same, reference being had to the accompanying drawings forming part of this specification.

The object of this invention is to provide an efficient means of making clear and transparent ice.

The invention consists of making a break in the distilling apparatus, so that all the air or other gases are removed by said break in the condensation of the water.

The drawings A B C D show the working of said invention.

A is the perspective view.

B section on C D, and

C section on A B of top view D.

The steam is supposed to enter at $a$ into what may be called the condenser, passes through the pipes $b$, which are immersed in cold water, which deprives the steam of part of its caloric, and is then discharged into the vessel $c$, where the break in the distillation takes place. Here the water or condensed steam is deprived of all gases that are not condensable, at say 212° Fahrenheit. This vessel is provided with an open chimney to carry the gases off.

From the chamber $c$ the hot water enters at the lower part of the condenser through pipe $d$, when it is cooled down by passing through where the cold water enters, it is thoroughly condensed, and can be taken off at $e$ ready for use.

The pipe $f$ is where the cold water is thrown into the condenser, and the pipe $g$ is where the condensing water is taken off.

Having thus described my invention,

I claim as new, and desire to secure by Letters Patent—

The break in the process of distillation at or near the boiling temperature, say from 180° to 210°, and blowing the product of distillation into a small receiving-tank, allowing all the air and other incondensable gases to escape up a vapor-pipe with a small margin of steam, and thence through the condenser to the discharge-pipe, where it is ready for use for the manufacturing of clear and transparent ice.

THOMAS F. PETERSON.

Witnesses:
DAVID JAMES,
JOHN ROY.